United States Patent [19]

Martin et al.

[11] 4,111,485
[45] Sep. 5, 1978

[54] DUMP TRUCK WITH TELESCOPING CONTAINER BODY

[75] Inventors: John C. Martin; Paul H. Martin, both of Toronto, Canada

[73] Assignee: Diesel Equipment Limited, Toronto, Canada

[21] Appl. No.: 759,877

[22] Filed: Jan. 17, 1977

[30] Foreign Application Priority Data

Apr. 26, 1976 [CA] Canada .................................. 250998

[51] Int. Cl.$^2$ .............................................. B60P 1/28
[52] U.S. Cl. ...................................... 298/1 B; 104/162; 198/737; 296/26; 298/8 R; 298/12; 298/22 R
[58] Field of Search ............... 298/12, 8 R, 1 B, 22 R; 296/26, 27; 198/737, 741; 104/162

[56] References Cited

U.S. PATENT DOCUMENTS

| | | | |
|---|---|---|---|
| 779,804 | 1/1905 | Rodenhausen | 298/8 R X |
| 2,900,922 | 8/1959 | Edmonds | 104/162 |
| 3,219,218 | 11/1965 | Hand | 104/162 X |
| 3,827,753 | 8/1974 | Pitts | 298/1 B X |

*Primary Examiner*—Drayton E. Hoffman
*Assistant Examiner*—George F. Abraham

*Attorney, Agent, or Firm*—Fetherstonhaugh & Co.

[57] ABSTRACT

A dump truck having a telescoping container body which is initially telescoped to a reduced length to discharge a portion of the load therefrom in response to the telescoping action and thereafter elevated to discharge the remainder of the load in the manner of a conventional dump truck. The fully extended length of the container body, which determines the load carrying capacity of the container body, is greater than that which would normally be elevated to directly discharge the load therefrom in the manner of a conventional dump truck. The retracted length of the container body is no greater than the acceptable length of a container body for elevating to dump a load in a conventional manner. The improvement in a dump truck consists of a container body which has a front section and a back section telescoped one within the other and a first drive mechanism associated with a front section for driving the front section longitudinally of the frame between the extended and retracted positions and a second drive mechanism associated with the back section for moving the back section from its lowered position to its elevated position to dump a load therefrom.

14 Claims, 10 Drawing Figures

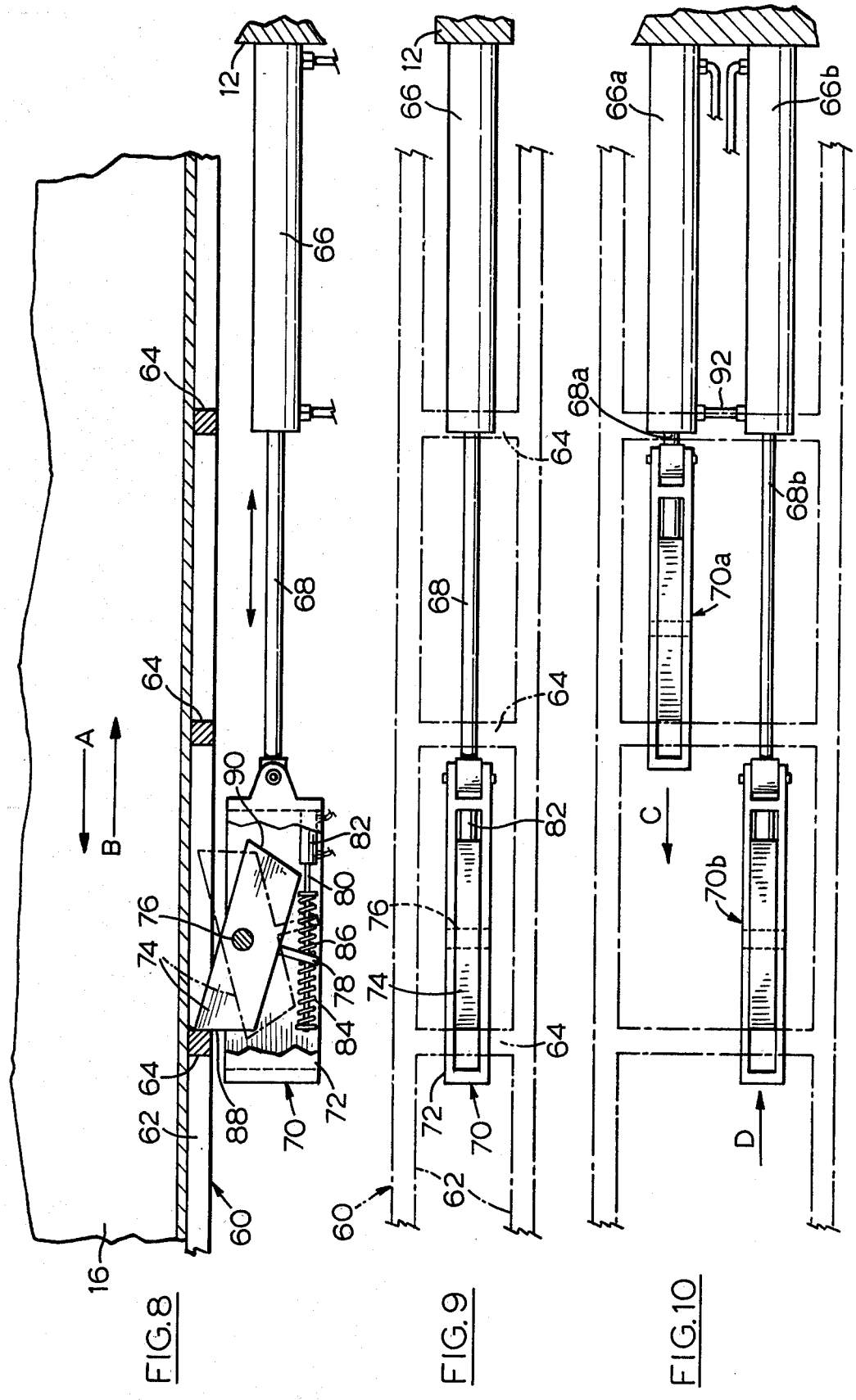

4,111,485

DUMP TRUCK WITH TELESCOPING CONTAINER BODY

This invention relates to improvements in dump trucks.

PRIOR ART

The load carrying capacity of a conventional dump truck is limited by the fact that it is necessary to maintain the length of the container body at a length which can be elevated for dumping without rendering the vehicle unstable when the container body is in the elevated position. It is for this reason that the vast majority of dump trucks which are presently available have a much shorter container body than many other road going transportation vehicles. Various attempts have been made to overcome this difficulty and one such proposal is contained in U.S. Pat. No. 3,361,477, dated Jan. 2, 1968. This patent discloses a structure in which two container bodies are mounted on a single frame. The two container bodies are separate and distinct bodies each defining a separate and distinct load carrying compartment. Both compartments are discharged by elevating the front end thereof to discharge the load from the rear end. In order to discharge a load, the rear compartment is elevated and then lowered and the front compartment is telescoped within the rear compartment and the combined assembly is then elevated to unload the front compartment. When this structure is used, it is essential to ensure that the front and rear container bodies are separate and distinct from one another so that the rear compartment can be tipped independently of the front compartment. It is also necessary to ensure that the front compartment is spaced a substantial distance forwardly of the rear compartment to permit the rear compartment to move to its elevated position. For this reason there must be a substantial space provided between the front and rear compartment when the vehicle is arranged for transportation of the load. The space between these compartments is, however, lost space so far as the bay load is concerned and consequently the full length of the vehicle is not loaded to its capacity.

Telescoping container bodies for trucks have previously been proposed. However, despite the fact that we have been associated with the manufacture of dump truck bodies for a great many years, we have not previously encountered a commercially acceptable vehicle which employed a telescoping container body.

A dumping truck employing a telescoping container body is described in U.S. Pat. No. 2,663,439. In this structure the container body is made up of a large number of short lengths which are telescoped one within the other. The forward section has a front wall which is rearwardly and downwardly inclined so as to ensure that it will be completely emptied when telescoped within the rearmost section. This structure is extremely complex and requires that the sections be telescoped one within the other in sequence so that the forward section is telescoped entirely within the second section before the second section is telescoped within the third section and so forth. This requires an elaborate longitudinal drive mechanism. Phelps indicates that this structure is necessary in order to ensure that the telescoping action will effectively remove the load.

While telescoping container bodies have not obtained wide acceptance and the trucking industry has accepted the dump trucks despite the limitations in load carrying capacity, we have developed a container body structure which when considered as a whole provides a container body which has a single load carrying compartment of greater length than could normally be elevated for dumping and which consists of only two sections capable of telescoping one within the other to a length which is stable when elevated for dumping purposes. The difficulties associated with the lack of stability of dumping a long container body have been eliminated by the fact that the length of the body is telescoped to a length which can be easily and safely elevated for dumping.

The stability of the container body of the present invention can be further improved by forming the front section of the body with a length which is greater than that of the back section so that when the front section is telescoped within the back section, a portion of the front section will project rearwardly from the back section. This rearwardly projecting portion will be located below the rear end of the back portion when the container body is in the elevated dumping position. By locating a portion of the front section of the container body below the rear end of the back section, the centre of gravity of the telescoped container body is lowered despite the fact that the extended length of the container body is greater than that available when the front and back sections are of substantially equal length.

According to one aspect of the invention there is provided in a dump truck having a longitudinally extending support frame, the improvement of, the container body consisting of a front section and a back section telescoped one within the other and having a common container compartment formed inwardly thereof, the front section is mounted for longitudinal movement relative to the frame and the back section whereby the front section may extend forwardly from the back section to a first position in which the common compartment is of substantially greater length than either of the sections taken alone and a second position in which the front section is telescoped with respect to the back section to a stable tippable length, the back section is pivotally mounted on said frame so as to be movable between a lower position for transporting a load in an elevated position for dumping a load and first drive means associated with the front section for driving the front section longitudinally of the frame between said first and second positions thereby to effect a partial discharge of the load contained within the common container compartment rearwardly from the back section in response to movement towards said second position in use, and second drive means associated with said back section for moving said back section from said lowered position to said elevated position to complete the discharge of a load from the common container by dumping action.

The invention will be more clearly understood after reference to the following detailed specification read in conjunction with the drawings wherein;

FIG. 8 is a side view of a drive mechanism for telescoping the container body;

FIG. 9 is a top view of the drive mechanism of FIG. 8; and

FIG. 10 is a top view of a drive mechanism according to a further embodiment of the present invention.

Figure 3:
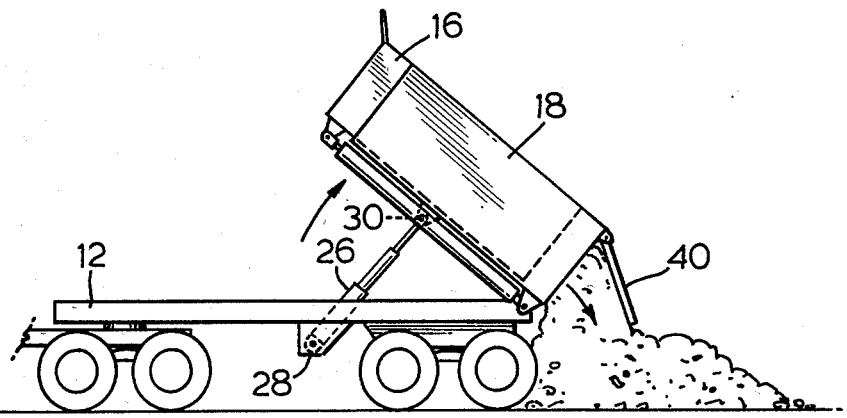
FIG. 3 is a view similar to FIG. 2 showing a further stage in the discharge of the load.

With reference to the drawings, the reference numeral 10 refers generally to a dump truck according to an embodiment of the present invention. The dump truck has a longitudinally extending frame 12 on which the container body 14 is mounted. The container body 14 consists of a front section 16 and a back section 18. The front section 14 is adapted to slide telescopically within the back section 18 and is reciprocally driven with respect to the frame 12 by means of a hydraulic drive unit 20. The back section 18 is mounted on a shaft 22 to pivot with respect to the frame 12. One end of the reciprocating hydraulic drive unit 20 is mounted on the shaft 22 and the other end is secured to the front section 14 by a bracket 24. As shown in FIG. 3, a second hydraulic drive unit 26 has one end secured to a support structure 28 mounted on the frame 12 and another end pivotally mounted on a pivot pin 30 which is mounted on the underside of the back section 18 of the container body. This mechanism is the conventional hydraulic tipping mechanism used to elevate the front end of a dump truck body.

Figure 4:
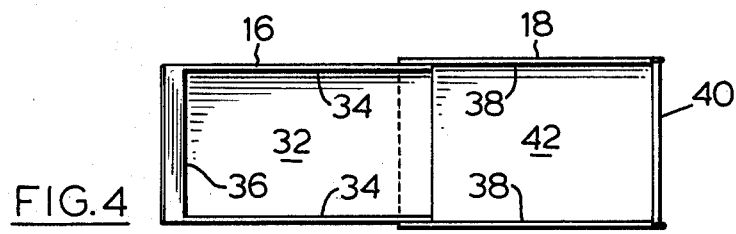
FIG. 4 is a plan view of a container body.

As shown in FIG. 4 of the drawings, the front section 14 of the container body consists of a bottom wall 32, a pair of oppositely disposed side walls 34 and a front wall 36. The back section 18 consists of a pair of oppositely disposed side walls 38, a tailgate 40 and a bottom wall 42. The tailgate 40 is of the conventional type used on dump trucks and is adapted to be releasably secured in the closed position shown in FIG. 1 and is releasable to move to the open positions shown in FIGS. 2 and 3 of the drawings. As shown in FIG. 4 of the drawings, the back end of the front section 14 is open and the front end of the back section 18 is open so that a common container compartment is formed thereby. In all positions of the front section with respect to the back section, the front section will be at least partially telescoped within the back section, the front section is never fully withdrawn from the back section, as to do so would require the closing of the back end of the front section and a front end of the back section. If the back end of the front section was closed by an end closure wall, considerable difficulty would be experienced in attempting to move the closure wall aside in order to permit the removal of the load from the back section by the telescoping of the front section within the back section.

Figure 1:
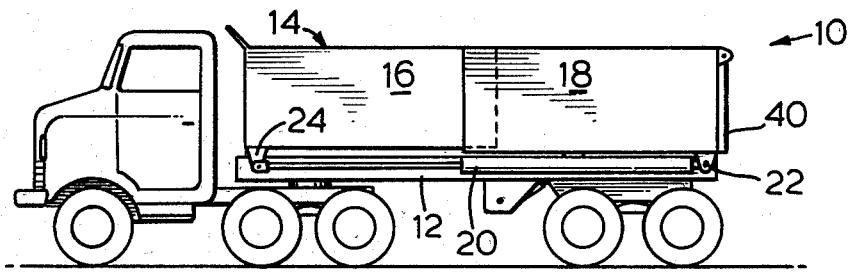
FIG. 1 is a side view of a dump truck according to an embodiment of the present invention.
Figure 2:
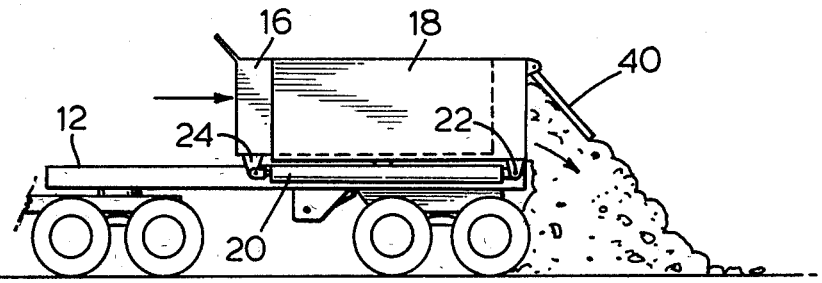
FIG. 2 is a partial side view of the dump truck body showing a first stage in the discharge of a load.

In use, the container body is filled with a dumpable load when it is in the extended configuration shown in FIG. 1 of the drawings in which position the capacity of the container body is at its greatest. It will be noted that in this construction a container body having substantially the full length of the support frame is employed. The load may be distributed over the full length of the frame. In order to discharge a load, the tailgate 40 is released and the hydraulic drive unit 20 is activated to cause the front section to telescope within the back section and thereby cause a portion of the load to be be discharged at the back end of the back section as shown in FIG. 2 of the drawings. The front section 14 will be drawn inwardly of the back section 18 until the combined length of the front and back sections is no greater than the acceptable length of a conventional dump truck container body. When the container has been effectively shortened by telescoping as described above, the hydraulic cylinder 26 is activated to elevate the front end of the telescoped container body to discharge the remainder of the load by means of a conventional dumping action. After the dumping has been completed the container body is lowered to the horizontal position. After the container body has been lowered to the horizontal position, the vehicle may be driven forwardly at conventional road going speeds during which the container body may be extended by operation of the drive mechanism 20. By reason of the fact that the container body has been lowered to the horizontal position there is no loss of stability by extending the container body while the vehicle is in motion.

While the above description of the preferred embodiment of the present invention does not include a detailed description of all of the components necessary for mounting the container body, it will be understood that these details are well known in the industry and are applied to conventional dump trucks.

The hydraulic drive unit 20 used for telescoping the container body is pivoted about the shaft 22 about which the rear container body 18 also pivots to permit this drive unit to be elevated with the contracted container body as shown in FIG. 3.

Figure 5:
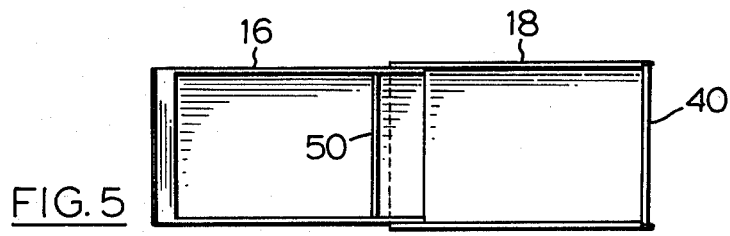
FIG. 5 is a plan view similar to FIG. 4 showing the addition of a batch gate to the container body.

Various modifications will be apparent to those skilled in the art without departing from the scope of the invention. For example, as shown in FIG. 5 of the drawings a batch gate 50 may be located at any point along the length of the front section 16 so as to separate two distinct loads from one another within the container body. This again is common practice in the industry.

Figure 6:
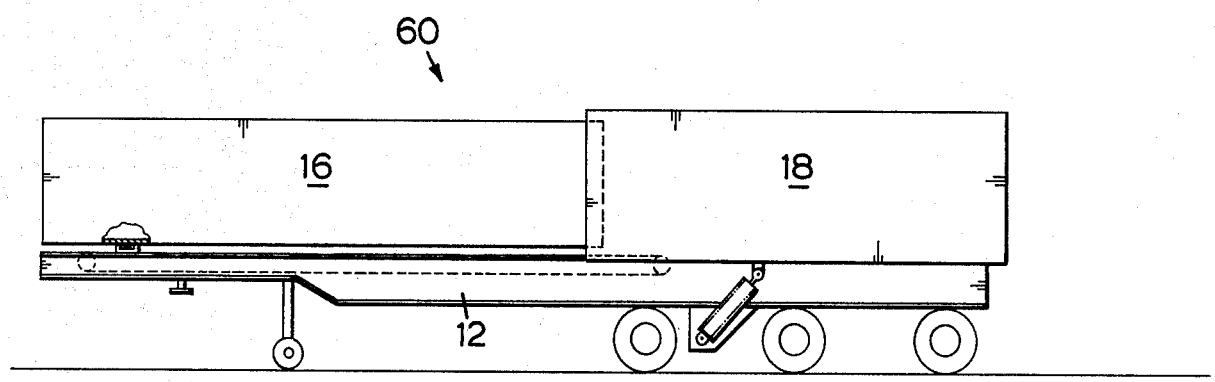
FIG. 6 is a side view of a dump truck trailer body in which the front section of the body is longer than the back section.
Figure 7:
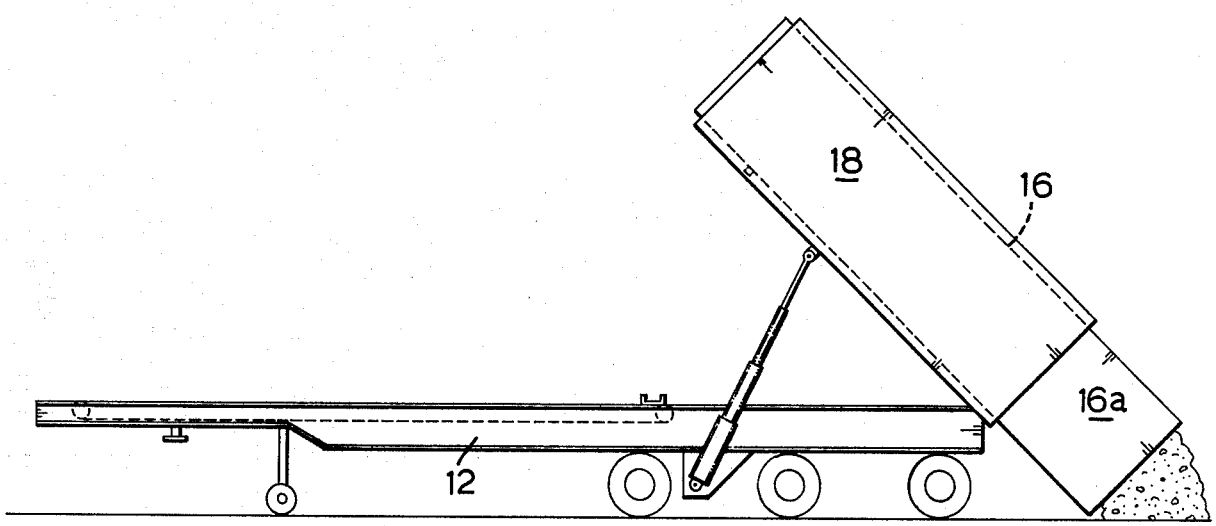
FIG. 7 is a view similar to FIG. 6 showing the container body in the telescoped and dump position.

With reference to FIG. 6 of the drawings, the reference numeral 52 refers generally to a dump truck trailer body in which like numerals apply to like parts to those identified in FIGS. 1 through 5. In this embodiment, the front section 16 of the container body is substantially longer than the back section 18, with the result that when the container body is telescoped to the position shown in FIG. 7 a substantial portion 16a of the front section 16 projects rearwardly from the back section 18. The portion 16a is preferably at least 10% of the length of the back section 18. When the container body is in the position shown in FIG. 7, the portion 16a has a centre of gravity which is lower than the centre of gravity of the container body illustrated in FIG. 3 of the drawings, with the result that the centre of gravity of the container body illustrated in FIG. 7 is lower than that illustrated in FIG. 3. The lowering of the centre of gravity of a container body of a dump truck when it is in the elevated position serves to increase the stability of the container body and reduce the likelihood of the body falling over during the dumping operation. The lengthening of the front section 16 serves to increase the load carrying capacity of the container body and this increased capacity is obtained without raising the centre of gravity of the container body as a whole.

An alternative telescoping drive mechanism is illustrated in FIGS. 8 and 9 of the drawings. As shown in FIGS. 8 and 9 of the drawings, a toothed rack 60 is mounted on the underside of the front section 16 of the container body. The rack consists of a pair of longitudinally extending rails 62 having a plurality of transverse teeth members 64 located at uniformly spaced intervals along the length thereof. A double acting hydraulic cylinder 66 is mounted on the frame 12 and has a reciprocating piston rod 68 projecting outwardly from one end thereof. A pawl mechanism 70 is mounted at the outer end of the piston rod 68 and includes a frame 72 within which a pawl 74 is pivotally mounted on a transverse pivot pin 76. The pawl 74 has an arm 78 projecting downwardly therefrom. The arm 78 is mounted on the reciprocating shaft 80 of a double acting air cylinder 82. Centering springs 84 and 86 serve to centre the arm on the shaft 80. The pawl 74 has oppositely disposed pushing faces 88 and 90. The air cylinder 82 is operative to move the pawl 74 between the positions shown in solid lines and in broken lines in FIG. 8 to selectively engage the teeth 64 for movement of the rack 60 in opposite longitudinal directions in response to movement of the connecting rod 68 of the double acting hydraulic cylinder 66. In use, when it is necessary to move the container body 16 in the direction of the arrow A, the air cylinder 82 is activated to position the pawl 74 in the position shown in solid lines in FIG. 8. The double acting hydraulic cylinder 66 is then activated to move the pawl assembly 70 back and forth to engage successive teeth 64. The spring 86 yields as the pawl 74 is drawn backwardly over the next tooth 64 and serves to return the pawl 74 to the elevated driving position after it is drawn rearwardly over the tooth 64. The stroke of the hydraulic cylinder 66 is at least equal to the pitch of the rack teeth 64.

It will be apparent that the ratchet drive mechanism described above will provide for intermittent movement of the first section 16 with respect to the second section 18. In order to provide a substantially continuous movement, two drive units are provided as shown in FIG. 10 of the drawings. In this embodiment, the pawl assemblies 70a and 70b are of the same structure as that described above with respect to FIGS. 8 and 9 of the drawings. The hydraulic cylinders 64a and 64b are connected to one another by a conduit 92 so that the movement of the connecting rod 68a is synchronized with respect to the movement of the connecting rod 68b with the pawl assemblies 70a and 70b disposed 180° out of phase with one another. This mechanism provides for movement of the pawl 70a in the direction of the arrow C when the pawl 70b is moving in the direction of the arrow D and vice versa. With this mechanism the pawl carried by the pawl assembly 70a is pushing the container body in the direction of the arrow C when the pawl in the assembly 70b is ratcheting in the direction of arrow D to a position to engage the next tooth 64. When the pawl assembly 70a is fully extended and begins its return in the direction of the arrow C, the pawl 70b is fully retracted to begin its extension in the direction of the arrow D. The pitch of the rack teeth 64 and the length of the stroke of the double acting hydraulic cylinders is such that a substantially continuous movement of the rack 60 and the container body 16 is obtained.

It will be apparent from the foregoing that the drive mechanism is such that it is not necessary to provide a very long extending hydraulic cylinder. Hydraulic cylinders which have a very long extension are expensive to manufacture and are prone to damage in use. The double acting hydraulic cylinder of the present invention may have a stroke of the order of about 2 to 4 feet. Such a cylinder is substantially less expensive than that required to move a telescoping container body over a length of about 15 feet as might be required in the embodiment of the invention illustrated in FIG. 1.

In addition, the drive mechanism 20 of the present invention may be replaced by a drive mechanism similar to that described in U.S. Pat. No. 3,361,477, Pitts. The Pitts mechanism is permanently secured to the support frame and is not elevated with the container body during the dumping operation.

It will be understood that while it is advantageous to telescope the front section within the back section because it simplifies the location of the operating mechanisms, it may also be possible to telescope the back section with the front section. In addition, while the longitudinal telescoping drive mechanism is shown as being connected at one end to the frame and connected at the other end to the front section, the drive mechanism could consist of a rack and pinion drive mechanism in which the rack is carried by the front section and the driven pinion is carried by either of the back section or the frame. These and other modifications will be apparent to those skilled in the art.

A container body constructed according to the present invention may have a total length of about 40 feet which is far in excess of the length of a dump truck container body of the type which must be elevated over the full length to be unloaded.

From the foregoing, it will be apparent that the present invention provides a simple and effective structure for increasing the load carrying capacity of a vehicle of the dump truck type while retaining the characteristic of the dump truch which permits complete discharge of the load from the container body. These and other advantages of the present invention will be apparent to those skilled in the art.

A further advantage of the drive mechanism of the embodiments associated with the present invention resides in the fact that the double acting hydraulic cylinder may be mounted with respect to the frame and the front section of the container body so that the cylinder extends to push the front section towards the contracted position. This is in contrast to the double acting hydraulic cylinder of the embodiment illustrated in FIG. 1 wherein the cylinder must be contracted to move the front section to the contracted position. The efficiency of a double acting hydraulic cylinder is greater when pressure is being applied to the extension piston surface than it is when it is being applied to the contraction piston because the area of the contraction piston is reduced by the diameter of the piston rod. Thus, the double acting hydraulic cylinder required for the mechanism of FIG. 8 of the drawings may be of a lighter weight than that required for the embodiment illustrated in FIG. 1. These and other advantages will be apparent to those skilled in the art.

What we claim as our invention is:
1. In a dump truck having a longitudinally extending support frame, the improvement of;
 (a) a container body having an overall length which is variable and consisting of;
  (i) a front section and a back section telescoped one within the other such that the overall length of the container body is the combined length of the front and back sections, said front and back sections having a container compartment formed inwardly thereof;

(ii) said front section being mounted for longitudinal movement relative to said frame and back section whereby said front section may extend forwardly from said back section to a first position in which the overall length of the container body is at a maximum and a second position in which said front section is telescoped with respect to said back section to reduce the overall length of the container body to a stable tippable length, (iii) said back section being pivotally mounted on said frame so as to be movable between a lowered position for transporting a load and an elevated position for dumping a load, and (b) first drive means associated with said front section for driving said front section longitudinally of said frame between said first and second positions thereby to effect a partial discharge of a load contained within said container compartment rearwardly from said back section in response to movement towards said second position in use, (c) second drive means associated with said back section for moving said back section from said lowered position to said elevated position to complete the discharge of a load from said common container compartment.

2. In a dump truck having a longitudinally extending body support frame, the improvement of;

(a) a container body having an overall length which is variable, said container body being mounted on said frame and consisting of;

(i) a back section having a bottom wall, a pair of oppositely disposed side walls and a tailgate, said back section being open at its front end, (ii) a front section having a bottom wall, a pair of oppositely disposed side walls and a front wall, said front section being open at its back end, (iii) said front end of said back section and said back end of said front section being disposed one within the other thereby to provide a unitary container enclosure bounded by said bottom and side walls of said front and back sections and said front wall of said front section and said tailgate of said back section, (iv) said front section being mounted for longitudinal movement relative to said back section between a first position in which said front section projects a substantial distance forwardly from said back section and the overall length of the container body is at a maximum, a second retracted position in which the sections are telescoped one within the other to reduce the overall length of the container body to a length about equal to the length of the back section, (b) first drive means engaging said front section to drive said front section longitudinally of said frame between said first extended position and said second retracted position to discharge a portion of the load by way of the tailgate in use, (c) pivot means at the back end of said back section pivotally mounting said back section on said frame for movement between a lowered position resting on said frame for transporting a load and an elevated position in which the front end of the rear section is elevated to discharge a load therefrom when said dump body is in said second position, and (d) second drive means associated with said back section for moving said back section from said lowered position to said elevated position to complete the discharge of a load from said common container compartment.

3. A dump truck as claimed in claim 1 including a removable batch gate mounted on said front section for movement therewith, said batch gate dividing said compartment into two sub-compartments wherein two loads may be separated from one another during transportation.

4. A dump truck body as claimed in claim 1 wherein said front section of said container body is longer than said back section such that a portion of said front section projects rearwardly from said back section when said sections are located in said second position whereby the centre of gravity of the telescoped sections is lower than that of the back section alone when the telescoped sections are elevated for dumping.

5. A dump truck body as claimed in claim 4 wherein said front section is at least 15% longer than said back section.

6. A dump truck body as claimed in claim 2 wherein said front section of said container body is longer than said back section such that a portion of said front section projects rearwardly from said back section when said sections are located in said second position whereby the centre of gravity of the telescoped sections is lower than that of the back section alone when the telescoped sections are elevated for dumping.

7. A dump truck body as claimed in claim 6 wherein said front section is at least 15% longer than said back section.

8. A dump truck as claimed in claim 1 wherein said first drive means comprises, (a) a rack mounted on said front section of said container body and extending longitudinally thereof, said rack having a plurality of teeth spaced longitudinally thereon, (b) a pawl disposed closely adjacent said toothed rack, said pawl being adapted to engage said teeth to selectively move said truck to and fro in its longitudinal direction, (c) reciprocating drive means mounted on said truck and engaging said pawl to drive said pawl to and fro, said reciprocating drive means having a stroke length which is substantially less than the total travel of the front section in either direction whereby a plurality of strokes of the reciprocating drive means is required to effect movement of the front section between said first and second positions.

9. A dump truck as claimed in claim 1 wherein said first drive means comprises, (a) a rack mounted on said front section of said container body and extending longitudinally thereof, said rack having a plurality of teeth located at longitudinally spaced intervals thereon, (b) first and second double acting pawl members disposed closely adjacent said toothed rack and adapted to drivingly engage said teeth and ratchet along said teeth of said rack as required in use, (c) said first and second double acting pawl members each including means for selectively locating said pawl members in a first position to engage said teeth of said rack to move said rack longitudinally of itself in a first direction and a second position to engage said teeth of said rack to move said rack in a second direction opposite to said first direction, (d) first reciprocating drive means and second reciprocating drive means mounted on said truck and drivingly engaging said first and second double acting pawl members respectively to drive said first and second pawl members to and fro in said longitudinal direction, said first and second reciprocating drive means having a stroke in said longitudinal direction which is substantially less than the total travel of the front section in moving from said first position to said second position, the movement of said first and second reciprocating drive means being synchronized such that they move in opposite directions to one another and thus provide a substantially continuous movement of said first section with respect to said second section.

10. In a dump truck having a telescopic container body mounted on a frame, the container body consisting of a front section mounted to telescope within a back section to effect a discharge of at least a portion of load carried by the container body, the improvement of drive means for driving the front section to and fro between an extended position and a contracted position comprising;

(a) a rack mounted on said front section of said container body and extending longitudinally thereof, said rack having a plurality of teeth located at longitudinally spaced intervals thereon, (b) first and second double acting pawl members disposed closely adjacent said toothed rack and adapted to drivingly engage said teeth and ratchet along said teeth of said rack as required in use, (c) said first and second double acting pawl members each including means for selectively locating said pawl members in a first position to engage said teeth of said rack to move said rack longitudinally of itself in a first direction and a second position to engage said teeth of said rack to move said rack in a second direction opposite to said first direction, (d) first reciprocating drive means and second reciprocating drive means mounted on said truck and drivingly engaging said first and second double acting pawl members respectively to drive said first and second pawl members to and fro in said longitudinal direction, said first and second reciprocating drive means having a stroke in said longitudinal direction which is substantially less than the total travel of the front section in moving from said first position to said second position, the movement of said first and second reciprocating drive means being synchronized such that they move in opposite directions to one another and thus provide a substantially continuous movement of said first section with respect to said second section.

11. In a dump truck having a longitudinally extending support frame, the improvement of;

(a) a container body consisting of,
(i) a front section and a back section telescoped one within the other and having a common container compartment formed inwardly thereof;
(ii) said front section being mounted for longitudinal movement relative to said frame and back section whereby said front section may extend forwardly from said back section to a first position in which said common compartment is of substantially greater length than either of said sections taken alone and a second position in which said front section is telescoped with respect to said back section to a stable tippable length,
(iii) said back section being pivotally mounted on said frame so as to be movable between a lowered position for transporting a load and an elevated position for dumping a load, and (b) first drive means associated with said front section for driving said front section longitudinally of said frame between said first and second positions thereby to effect a partial discharge of a load contained within said common container compartment rearwardly from said back section in response to movement towards said second position in use, (c) second drive means associated with said back section for moving said back section from said lowered position to said elevated position to complete the discharge of a load from said common container compartment, (d) said front section of said container body is longer than said back section such that a portion of said front section projects rearwardly from said back section when said sections are located in said second position whereby the centre of gravity of the telescoped sections is lower than that of the back section alone when the telescoped sections are elevated for dumping.

12. A dump truck body as claimed in claim 11 wherein said front section is at least 15% longer than said back section.

13. In a dump truck having a longitudinally extending body support frame, the improvement of:

(a) a container body mounted on said frame consisting of;
(i) a back section having a bottom wall, a pair of oppositely disposed side walls and a tailgate, said back section being open at its front end,
(ii) a front section having a bottom wall, a pair of oppositely disposed side walls and a front wall, said front section being open at its back end,
(iii) said front end of said back section and said back end of said front section being disposed one within the other thereby to provide a unitary container enclosure bounded by said bottom and side walls of said front and back sections and said front wall of said front section and said tailgate of said back section,
(iv) said front section being mounted for longitudinal movement relative to said back section between a first position in which said front section projects a substantial distance forwardly from said back section and a second retracted position in which the sections are telescoped one within the other to a length about equal to the length of the back section, (b) first drive means engaging said front section to drive said front section longitudinally of said frame between said first extended position and said second retracted position to discharge a portion of the load by way of the tailgate in use, (c) pivot means at the back end of said back section pivotally mounting said back section on said frame for movement between a lowered position resting on said frame for transporting a load and an elevated position in which the front end of the rear section is elevated to discharge a load therefrom when said dump body is in said second position.

(d) said front section of said container body is longer than said back section such that a portion of said front section projects rearwardly from said back section when said sections are located in said second position whereby the centre of gravity of the telescoped sections is lower than that of the back section alone when the telescoped sections are elevated for dumping.

14. A dump truck body as claimed in claim 13 wherein said front section is at least 15% longer than said back section.

* * * * *